(12) United States Patent
Rajakumar et al.

(10) Patent No.: US 6,937,440 B2
(45) Date of Patent: Aug. 30, 2005

(54) HEAD SLIDER HAVING CONVERGENT CHANNEL FEATURES WITH SIDE OPENING

(75) Inventors: Rajashankar Rajakumar, Richfield, MN (US); Michael D. Mundt, Longmont, CO (US); Anthony P. Sannino, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 170 days.

(21) Appl. No.: 10/377,191

(22) Filed: Feb. 28, 2003

(65) Prior Publication Data

US 2004/0012887 A1 Jan. 22, 2004

Related U.S. Application Data

(60) Provisional application No. 60/396,583, filed on Jul. 17, 2002.

(51) Int. Cl.[7] .................... G11B 5/60; G11B 15/64; G11B 17/32; G11B 21/20
(52) U.S. Cl. ..................................... 360/236.2
(58) Field of Search .............. 360/236.2, 230, 360/234, 234.3, 235.4, 235.8, 235.9, 236.6, 236.7, 236.8, 236.9, 237, 236.1

(56) References Cited

U.S. PATENT DOCUMENTS

| | | | |
|---|---|---|---|
| 3,855,625 A | 12/1974 | Garnier et al. | 360/235.6 |
| 4,212,044 A | 7/1980 | Plotto | 360/236.4 |
| 4,218,715 A | 8/1980 | Garnier | 360/236.2 |
| 4,553,184 A | 11/1985 | Ogishima | 360/235.8 |
| 4,646,180 A | 2/1987 | Ohtsubo | 360/236.6 |
| 4,984,114 A | 1/1991 | Takeuchi et al. | 360/236.4 |
| 5,086,360 A | 2/1992 | Smith et al. | 360/236.6 |
| 5,128,822 A | 7/1992 | Chapin et al. | 360/263.3 |
| 5,200,868 A | 4/1993 | Chapin et al. | 360/236.1 |
| 5,317,465 A | 5/1994 | Chapin et al. | 360/236.1 |
| 5,343,343 A | 8/1994 | Chapin | 360/236.1 |
| 5,359,480 A | 10/1994 | Nepela et al. | 360/236.9 |
| 5,396,386 A | 3/1995 | Bolasna et al. | 360/236.1 |
| 5,490,026 A | 2/1996 | Dorius et al. | 360/236.3 |
| 5,513,056 A | 4/1996 | Kawasaki et al. | 360/236.9 |
| 5,515,219 A | 5/1996 | Ihrke et al. | 360/239.1 |
| 5,550,693 A | 8/1996 | Hendriks et al. | 360/236.6 |
| 5,624,581 A | 4/1997 | Ihrke et al. | 216/22 |
| 5,636,085 A | 6/1997 | Jones et al. | 360/236.6 |
| 5,737,151 A | 4/1998 | Bolasna et al. | 360/236.8 |
| 5,761,004 A | 6/1998 | Peck | 360/236.2 |
| 5,796,551 A | 8/1998 | Samuelson | 360/236.8 |
| 5,798,889 A | 8/1998 | Dorius et al. | 360/236.1 |
| 5,953,181 A | 9/1999 | Utsunomiya | 360/236.1 |
| 5,963,396 A | 10/1999 | Burga et al. | 360/236.9 |
| 5,973,881 A | 10/1999 | Ajiki | 360/235.8 |
| 6,115,219 A | 9/2000 | Hall | 360/234.2 |

(Continued)

FOREIGN PATENT DOCUMENTS

| | | |
|---|---|---|
| EP | 0747890 A1 | 12/1996 |
| JP | 1211383 | 8/1989 |

OTHER PUBLICATIONS

Yong Hu et al., "Partial Contact Air Bearing Characteristics of Tripad Sliders for Proximity Recording", ASME, pp. 272–279, vol. 120, Apr. 1998.

Primary Examiner—Julie Anne Watko
(74) Attorney, Agent, or Firm—Westman, Champlin and Kelly, P.A.

(57) ABSTRACT

A head slider having a slider body with a disc facing surface and a bearing plane is provided. A first recessed area and a second recessed area are positioned on the disc facing surface and recessed from the bearing plane. A rail on the disc facing surface has a channel that includes a first side edge proximate the first recessed area and a second side edge proximate the second recessed area. The channel is isolated from the first recessed area and open to the second recessed area.

37 Claims, 13 Drawing Sheets

U.S. PATENT DOCUMENTS

| | | | |
|---|---|---|---|
| 6,144,528 A | 11/2000 | Anaya-Dufresne et al. | 360/235.4 |
| 6,172,851 B1 | 1/2001 | Utsunomiya | 360/236.3 |
| 6,188,547 B1 | 2/2001 | Gui et al. | 360/236.5 |
| 6,275,467 B1 | 8/2001 | Wang et al. | 369/300 |
| 6,304,418 B1 * | 10/2001 | Boutaghou et al. | 360/236.6 |
| 6,311,388 B1 | 11/2001 | Berg et al. | 29/603.12 |
| 6,333,835 B1 | 12/2001 | Kang et al. | 360/235.4 |
| 6,462,909 B1 | 10/2002 | Boutaghou et al. | 360/235.8 |
| 6,504,682 B1 | 1/2003 | Sannino et al. | 360/235.8 |
| 6,587,308 B2 * | 7/2003 | Sannino et al. | 360/236.3 |
| 6,606,222 B1 * | 8/2003 | Ryun | 360/236.5 |
| 6,661,661 B2 | 12/2003 | Gaynes et al. | 360/236.3 |
| 6,710,976 B2 * | 3/2004 | Chapin et al. | 360/235.8 |
| 2004/0027724 A1 * | 2/2004 | Pendray et al. | 360/236.3 |
| 2004/0120075 A1 * | 6/2004 | Rajakumar | 360/235.8 |

* cited by examiner

HEAD SLIDER HAVING CONVERGENT CHANNEL FEATURES WITH SIDE OPENING

CROSS-REFERENCE TO RELATED APPLICATIONS

This application claims the benefit of U.S. Provisional Application No. 60/396,583, entitled "OPEN SIDE RAIL TO MINIMIZE SENSITIVITY TO ALTITUDE, SLIDER SHAPE VARIATION AND PARTICLE SENSITIVITY TO VARYING SKEWS," filed Jul. 17, 2002.

FIELD OF THE INVENTION

The present invention relates to data storage systems and, more particularly, to a disc head slider for communicating with a recording medium.

BACKGROUND OF THE INVENTION

Disc drives of the "Winchester" and optical types are well known in the industry. Such drives use rigid discs, which are coated with a magnetizable medium for storage of digital information in a plurality of circular, concentric data tracks. The discs are mounted on a spindle motor, which causes the discs to spin and the surfaces of the discs to pass under respective hydrodynamic (e.g. air) bearing disc head sliders. The sliders carry transducers, which write information to and read information from the disc surfaces.

An actuator mechanism moves the sliders from track-to-track across the surfaces of the discs under control of electronic circuitry. The actuator mechanism includes a track accessing arm and a suspension for each head gimbal assembly. The suspension includes a load beam and a gimbal. The load beam provides a load force which forces the slider toward the disc surface. The gimbal is positioned between the slider and the load beam, or is integrated in the load beam, to provide a resilient connection that allows the slider to pitch and roll while following the topography of the disc.

The slider includes a bearing surface, which faces the disc surface. As the disc rotates, the disc drags air under the slider and along the bearing surface in a direction approximately parallel to the tangential velocity of the disc, As the air passes beneath the bearing surface, air compression along the air flow path causes the air pressure between the disc and the bearing surface to increase, which creates a hydrodynamic lifting force that counteracts the load force and causes the slider to lift and fly above or in close proximity to the disc surface.

One type of slider is a "self-loading" air bearing slider, which includes a leading taper (or stepped-taper), a pair of raised side rails, a cavity dam and a subambient pressure cavity. The leading taper is typically lapped or etched onto the end of the slider that is opposite to the recording head. The leading taper pressurizes the air as the air is dragged under the slider by the disc surface. An additional effect of the leading taper is that the pressure distribution under the slider has a first peak near the taper end or "leading edge" due to a high compression angle of the taper or step, and a second peak near the recording end or "trailing edge" due to a low bearing clearance for efficient magnetic recording. This dual-peak pressure distribution results in a bearing with a relatively high pitch stiffness.

The bearing clearance between the slider and the disc surface at the recording head is an important parameter to disc drive performance. As average flying heights continue to be reduced, altitude induced and manufacturing variation induced fly height loss are an increasing source of head contact and modulation that may lead to read/write failures. In addition, variations in slider shape (i.e. crown and cross curvature) lead to unwanted head disc contact. Particles entering between the slider and the disc surface may cause further damage.

Improved slider designs are therefore desired which minimize sensitivity of the slider to altitude, manufacturing variations and unwanted particles. Embodiments of the present invention address these problems and others, and offer advantages over the prior art.

SUMMARY OF THE INVENTION

One embodiment of the present invention is directed to a head slider having a slider body with a disc facing surface and a bearing plane. A first recessed area and a second recessed area are positioned on the disc facing surface and recessed from the bearing plane. A rail on the disc facing surface has a channel that includes a first side edge proximate the first recessed area and a second side edge proximate the second recessed area. The channel is isolated from the first recessed area and open to the second recessed area.

Another embodiment of the present invention is directed to a head slider having a slider body. The slider body includes a leading edge, a trailing edge, a first side edge, a side second edge and a disc-facing surface with a bearing plane. A cavity dam is positioned on the disc facing surface. In addition, a rail is positioned on the disc facing surface having a channel. The channel is defined by a channel floor, a trailing wall, a first side wall and a second side wall. The first side wall extends from the trailing wall to the cavity dam. The second side wall extends from the trailing wall toward the cavity dam and defines an opening between the trailing wall and the cavity dam.

Yet another embodiment includes a storage assembly having a housing, a disc rotatable about a central axis within the housing, an actuator mounted within the housing, and a slider supported over the disc by the actuator. The slider includes a slider body having a disc facing surface and a bearing plane. First and second recessed areas are positioned on the disc facing surface and recessed from the bearing plane. Also, the slider includes a rail on the disc facing surface having a channel, the channel including a first side edge proximate the first recessed area and a second side edge proximate the second recessed area. The channel is isolated from the first recessed area and open to the second recessed area.

DETAILED DESCRIPTION OF ILLUSTRATIVE EMBODIMENTS

Figure 1:
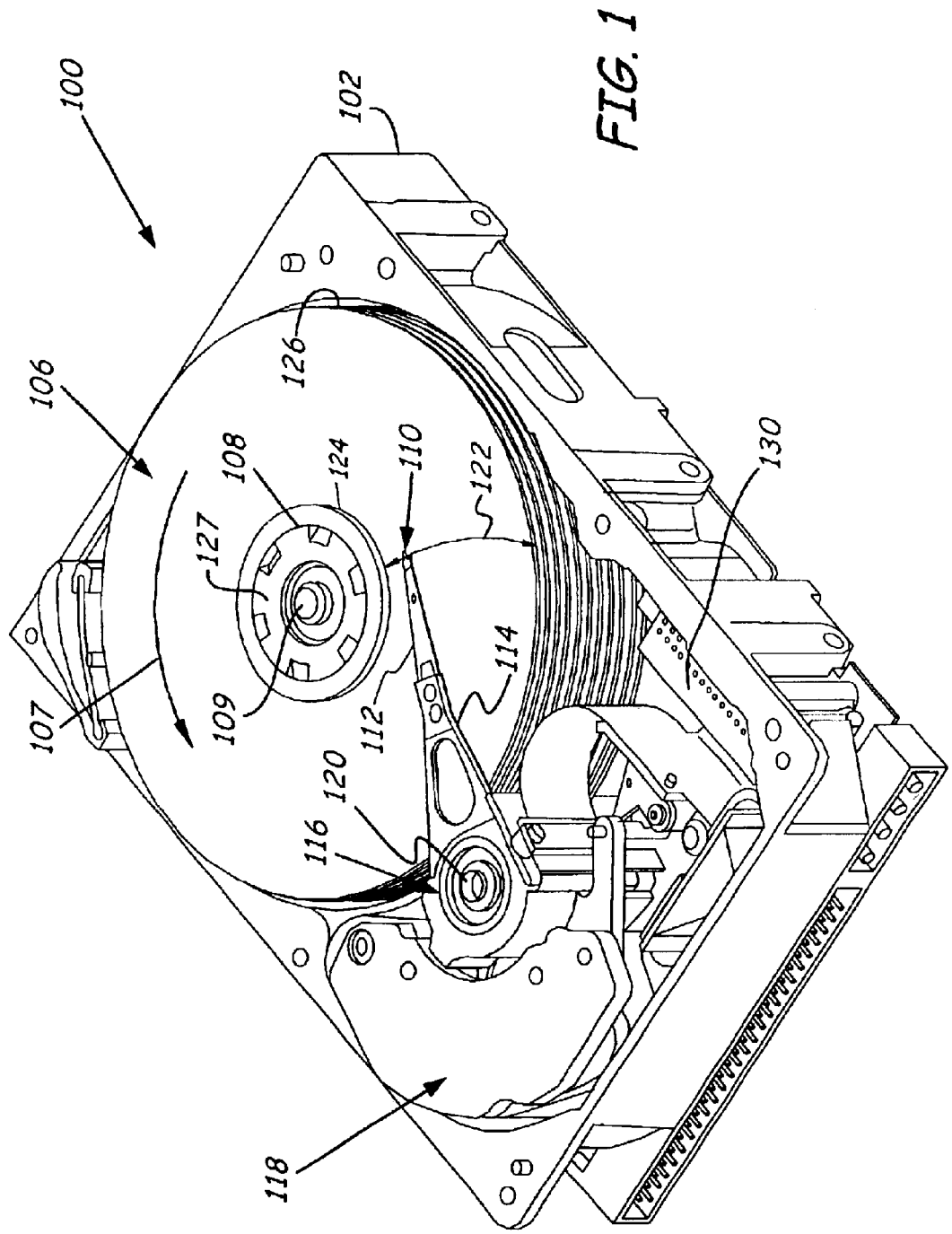
FIG. 1 is a perspective view of a disc drive in which the present invention is useful.

FIG. 1 is a perspective view of a disc drive 100 in which the present invention is useful. Disc drive 100 can be configured as a traditional magnetic disc drive, a magneto-optical disc drive or an optical disc drive, for example. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 110 which is mounted to disc drive 100 and carries a read/write head for communication with the disc surface.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 operates under control of internal circuitry 130. Other types of actuators can also be used, such as linear actuators.

As discussed in more detail below, slider 110 has a hydrodynamic (e.g., air) bearing that reduces negative effects due to variations in altitude, shape of the slider and particles on the disc surface. In particular, the bearing includes a channel that is isolated from a first recessed area and open to a second recessed area. This arrangement allows the slider to maintain consistent flying characteristics at varying altitudes. Additionally, rails positioned on the slider are designed to minimize effects of slider shape variations due to manufacture variations and minimize particles entering between the slider and the disc.

Figure 2:
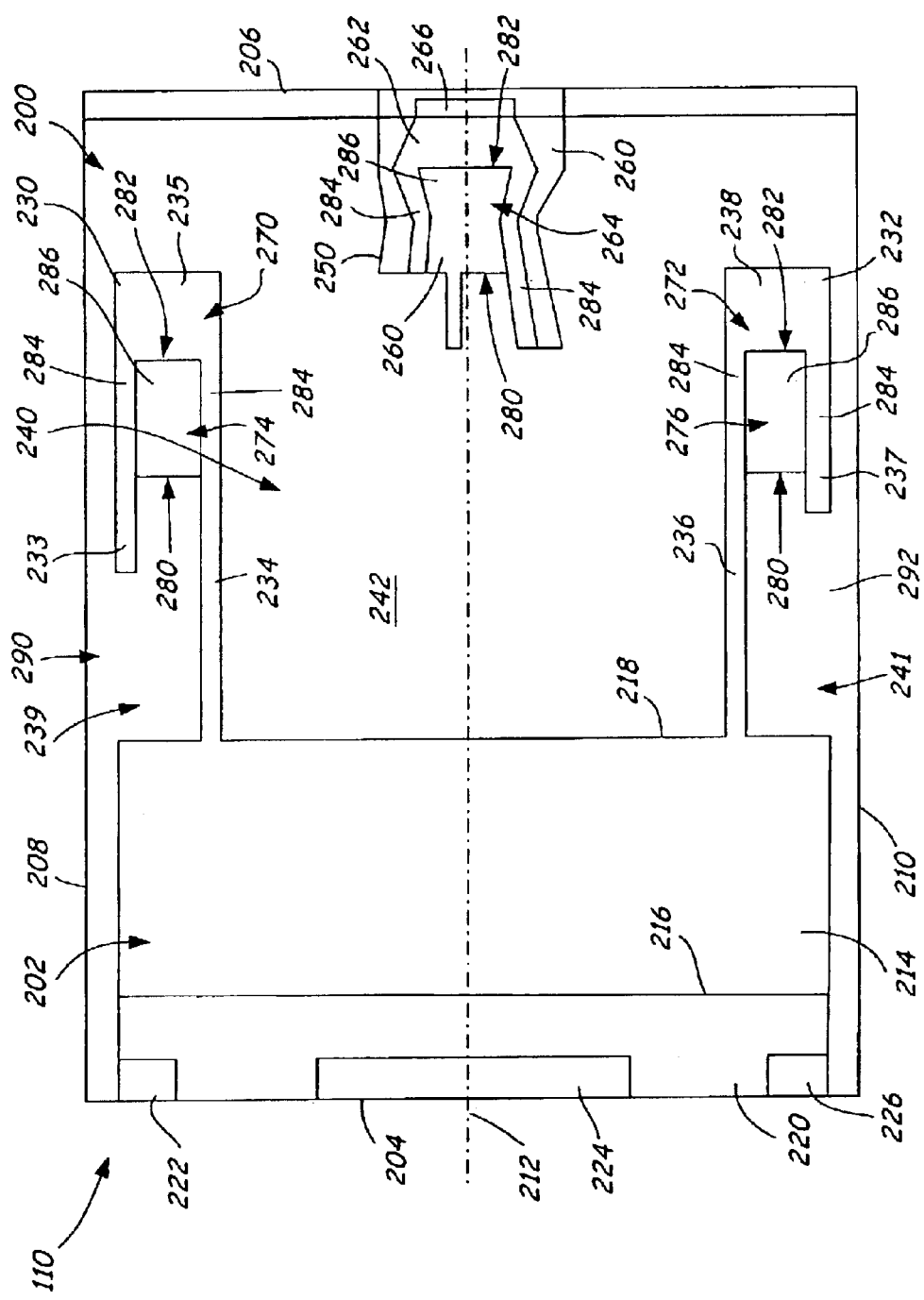
FIG. 2 is a plan view of a slider according to an embodiment of the present invention.
Figure 3:
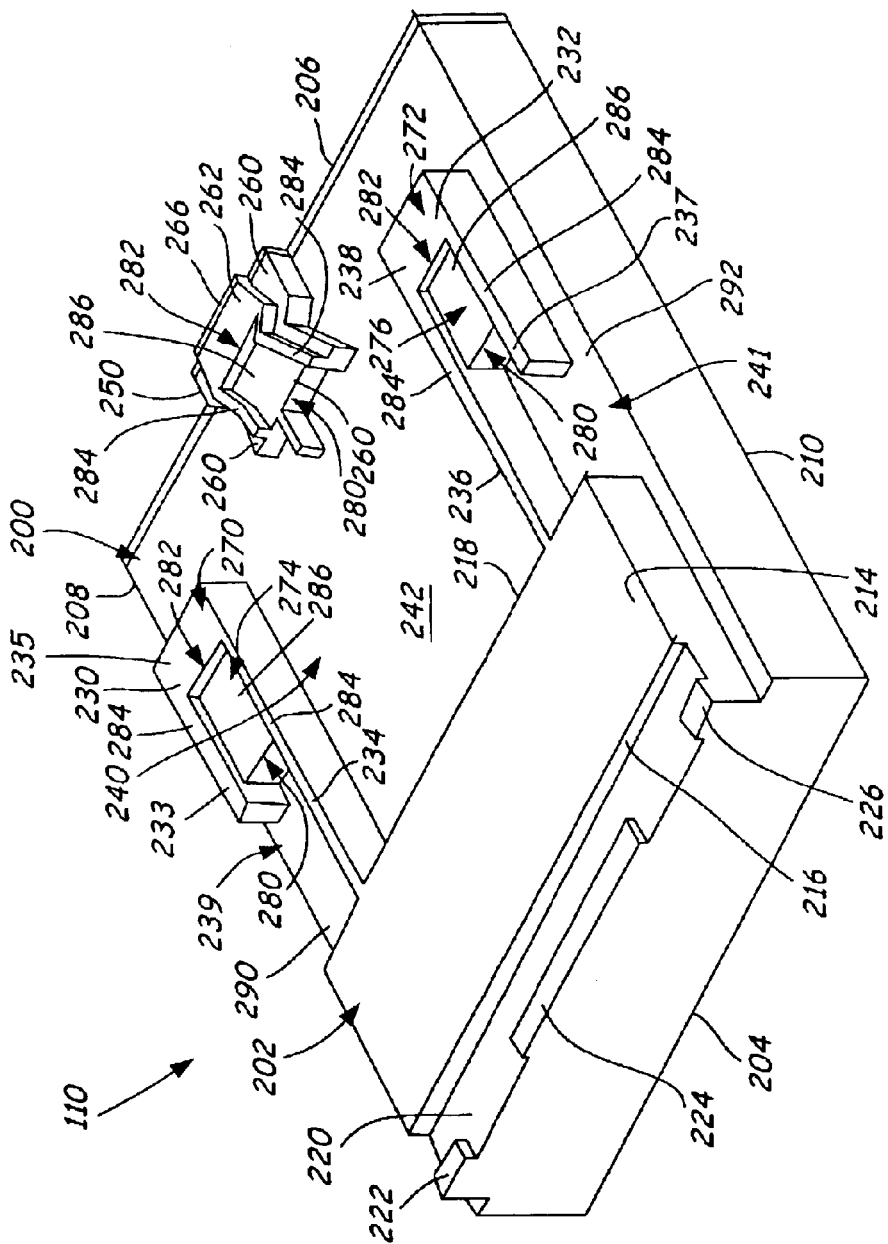
FIG. 3 is an isometric view of the slider in FIG. 2.

FIG. 2 is a bottom plan view of one of the sliders 110 of FIG. 1, as viewed from the surface of disc 107 according to one embodiment of the present invention. FIG. 3 illustrates an isometric view of slider 110 as viewed from the surface of disc 107. Slider 110 has a disc facing surface 200, which includes a bearing surface 202. Bearing surface 202 is a reference level for disc facing surface 200 from which other surface levels are recessed (or raised). Disc facing surfaces 200 includes a leading slider edge 204, a trailing slider edge 206, slider side edges 208 and 210, and a lateral center line 212. A cavity dam 214 extends between side edges 208 and 210, generally along leading slider edge 204. In one embodiment, the upper surface of cavity dam 214 is generally coplanar with and defines a portion of bearing surface 202. Cavity dam 214 has a leading edge 216 and a trailing edge 218.

A "stepped" leading taper 220 is formed along the leading edge 216 of cavity dam 214. "Stepped" leading taper 220 is recessed from bearing surface 202 by a substantially constant step depth in the range of about 0.1 microns to about 0.3 microns, for example, in order to provide pressurization for the bearing surface. Other step depths can also be used. In an alternative embodiment, leading taper 220 has a depth relative to the bearing plane that gradually decreases from leading slider edge 204 to the leading edge 216 of cavity dam 214. Leading taper 220 can be formed by any method, such as ion milling, reactive ion etching (RIE) or lapping. In one embodiment, leading taper 220 is formed by ion milling through a gray scale photolithography mask that allows multiple depths to be etched with a single mask. Leading taper 220 serves to pressurize air as the air is dragged under slider 110 by the disc surface. An additional effect of leading taper 220 is to create a first peak near leading edge 204 in the pressure distribution under slider 110. Leading taper 220 includes raised protrusions 222, 224 and 226 to aid in blocking particles from entering between a disc and disc facing surface 200.

A first side rail 230 is positioned along slider side edge 208 and a second side rail 232 is positioned along slider side edge 210. First side rail 230 includes an outside wall 233, an inside wall 234 and a trailing wall 235. Likewise, second side rail 232 includes an inside wall 236, an outside wall 237 and a trailing wall 238. Inside wall 234 extends from trailing wall 235 to cavity dam 214 while outside wall 233 extends from trailing wall 235 towards cavity dam 214 and defines an opening 239 between trailing wall 235 and cavity dam 214. Inside wall 236 extends from trailing wall 238 to cavity dam 214 while outside wall 237 extends from trailing wall 238 and defines an opening 241 between trailing wall 238 and cavity dam 214.

Slider 110 is fabricated such that it includes a crown and cross curvature. Variations in this fabrication cause slider to possess varying shapes. By reducing the surface area of rails 230 and 232 and spacing rails 230 and 232 apart from trailing edge 206, the effects of shape variation on fly height consistency are minimized. In particular, effects due to shape variations are reduced near trailing edge 206.

A subambient pressure cavity 240 is defined between cavity dam 214 and side rails 230 and 232. Subambient pressure cavity 240 is a recessed area having a cavity floor 242 which is recessed from bearing surface 202 by a cavity depth, which is greater than the step depth. In one embodiment, cavity depth 242 is in the range of about 1 micron to about 3 microns. Other cavity depths can also be used.

Subambient pressure cavity 240 trails cavity dam 214 relative to a direction of air flow from leading slider edge 204 toward trailing slider edge 206. Although rails 230 and 232 have reduced surface areas, the rails continue to define the cavity and isolate the cavity from ambient pressure along slider side edges 208 and 210.

Slider 110 further includes an isolated center bearing pad 250, which is positioned along trailing slider edge 206. Center pad 250 is positioned along lateral center line 212. In alternative embodiments, center pad 250 can be skewed or offset with respect to line 212.

Center pad 250 has leading and side step surfaces 260, a bearing surface 262 and a convergent channel feature (or "trench") 264. Bearing surface 262 is generally coplanar with the upper surface of cavity dam 214 and the bearing plane. Leading and side step surfaces 260 are generally parallel to and recessed from bearing surface 262 by the step depth of 0.1 to 0.3 microns, for example, for providing pressurization of bearing surface 262 from air flow venting from cavity 240. Center pad 250 supports a read/write transducer 266 along trailing slider edge 206. In alternative embodiments, transducer 266 can be positioned at other locations on slider 110. However, when placed at or near trailing slider edge 206, transducer 266 is located near the closest point on slider 110 to the surface of disc 107 (shown in FIG. 1) when slider 110 flies with a positive pitch angle. With a positive pitch angle, trailing slider edge 206 is closer to the surface of disc 107 than leading slider edge 204.

Similarly, side rails 230 and 232 include bearing surfaces 270 and 272 and convergent channel features 274 and 276, respectively. Bearing surfaces 270 and 272 are generally coplanar with the upper surface of cavity dam 214 and bearing surface 202.

Channels 264, 274 and 276 each have a leading channel end (or "inlet") 280, a trailing channel end (or "outlet") 282, side walls 284 and a channel floor 286. Channels 264, 274 and 276 can also be formed through photolithography processes such as ion milling, chemical etching or reactive ion etching (RIE), for example. Alternatively, channels 264, 274 and 276 can be formed along with rails 230 and 232 and pad 250 through an additive process such as material deposition.

In the embodiment shown in FIG. 2, channel floors 286 are recessed from the bearing plane by the step depth. In an alternative embodiment, channel floors 286 are vertically contoured relative to bearing surfaces 262, 270 and 272. For example, channel floors 286 can be tapered or otherwise vertically profiled so that the channel floors have a depth relative to bearing surfaces 262, 270 and 272 that progressively decreases along all or part of the length of the channel from leading channel end 280 to trailing channel end 282. The vertical profile can be linear, rectilinear, curved, curvilinear or a combination of these profiles. Also, a plurality of stepped surfaces can be used to approximate a taper along channel floors 286. Other vertically tapered profiles can also be used.

Leading channel end 280 of channel 264 is open to fluid flow from cavity 240. Leading channel ends 280 of channels 274 and 276 are open to fluid flow at ambient pressure from openings 239 and 241. Trailing channel ends 282 are closed to the fluid flow. Once the fluid flow enters channels 264, 274 and 276, the flow is essentially bounded by channel side walls 284 and trailing channel ends 282 and is forced to rise over trailing channel ends 282, forming a "convergent" channel for the flow. This creates localized pressure areas at discrete regions on bearing surfaces 262, 270 and 272, just rearward of trailing channel ends 282. In one embodiment, these discrete regions have surface areas rearward of trailing channels ends 282 that are at least as long as the width of the channels, as measured between side walls 284. This provides sufficient surface area on which the localized pressure gradients can act. These channels can be symmetrical about lateral center line 212, as shown in FIG. 2, or can be asymmetrical to provide preferential pressurization at certain slider skew angles. Channel side walls 284 can be parallel to one another or non-parallel to one another.

The localized positive pressure gradients developed along bearing surfaces 262, 270 and 272 assist in providing pitch and roll stiffness to slider 110 and provide an energy dissipation mechanism during slider vibration, which dampens leading edge pitch and roll mode type vibrations at the slider's natural resonance frequencies. Leading edge pitch mode type vibration refers to rotation about a line near the leading edge of the slider, whereas trailing edge pitch mode vibration refers to rotation about a line near the trailing edge of the slider. Roll mode type vibrations refer to rotation about the slider's lateral center line 212.

Recessed areas 290 and 292 are located along side edges 208 and 210, respectively. From the design of side rails 230 and 232, convergent channels 274 and 276 are generally open to recessed areas 290 and 292, respectively. Consequently, more airflow is provided to channels 274 and 276, and bearing surface 270 and 272 experience additional pressurization. Since inside walls 234 and 236 extend to cavity dam 214, side rails 230 and 232 isolate convergent channels 274 and 276 from subambient pressure cavity 240.

Figure 4:
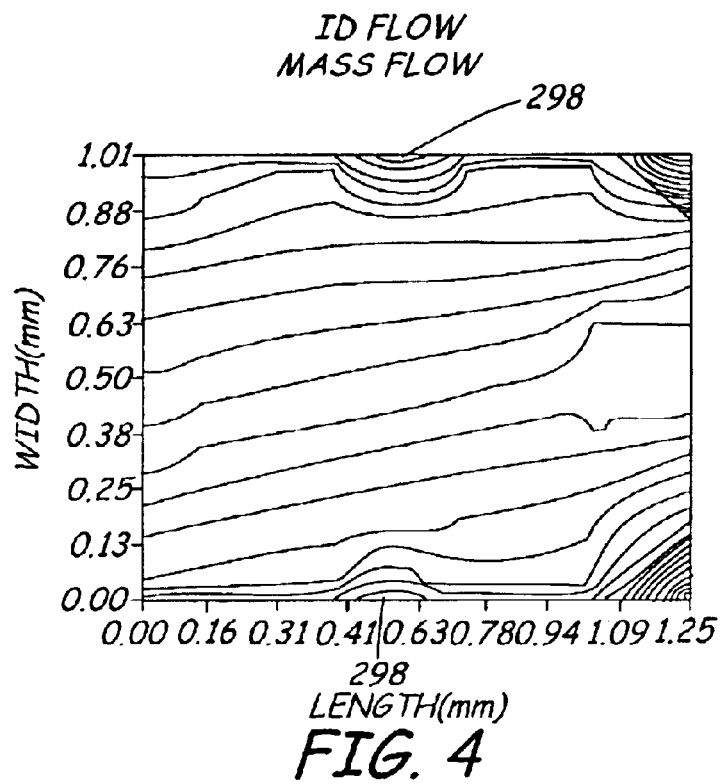
FIG. 4 is a mass flow representation of a slider when flying along an inner diameter of a disc.
Figure 5:
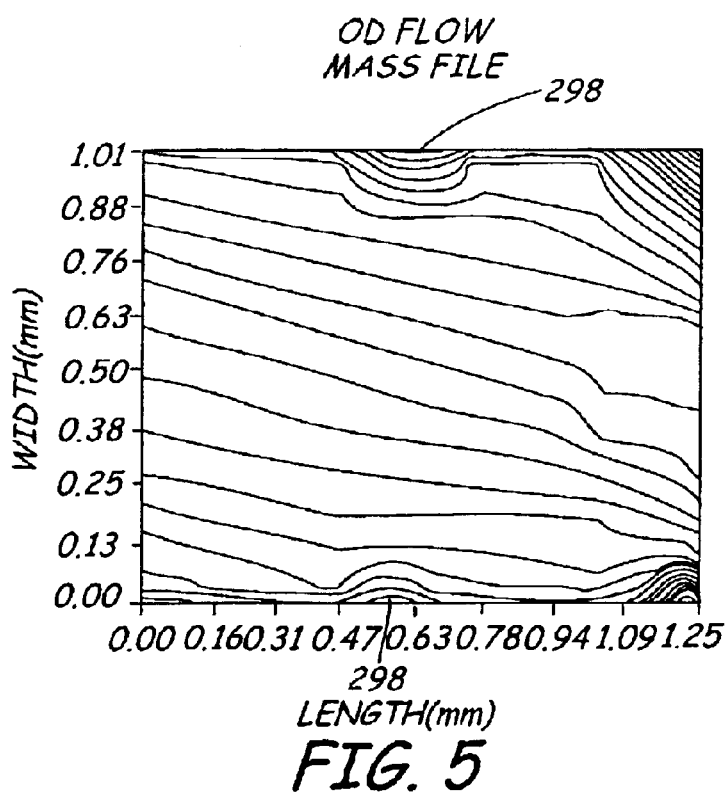
FIG. 5 is a mass flow representation of a slider when flying along an outer diameter of a disc.

It will also be appreciated that the slider shown in FIG. 2 is designed to prevent unwanted particles from entering between the slider and disc 107 at varying skew angles between inner diameter (ID) 124 and outer diameter (OD) 126. The ability to prevent particles from entering cavity 240 is in large part due to walls 234 and 236 extending from respective trailing walls 235 and 238 to cavity dam 214 and thus isolating recessed areas 290 and 292 from cavity 240. FIGS. 4 and 5 illustrate a mass flow along a slider having similar side rails to slider 110 at inner diameter 124 and outer diameter 126, respectively. As illustrated, regions 298 demonstrate that particles have difficulty entering between the slider and disc 107 along the side edges.

As appreciated by those skilled in the art, other sliders may be provided in accordance with the present invention. FIGS. 6–14 illustrate plan views of alternative embodiments according to the present invention.

Figure 6:
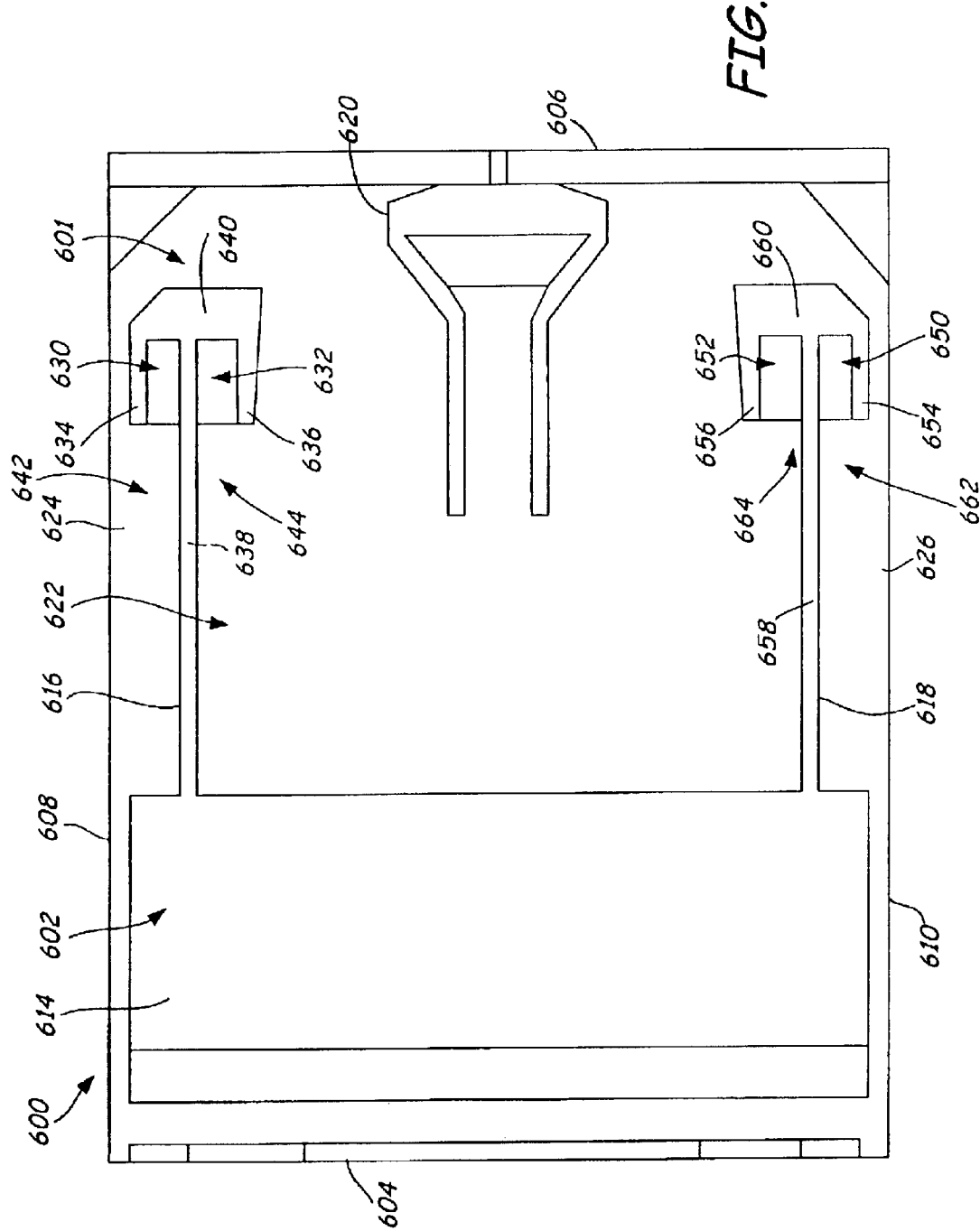
FIGS. 6–14 are plan views of sliders according to alternative embodiments of the present invention.

FIG. 6 illustrates slider 600 having a disc-facing surface 601 and a bearing surface 602. Slider 600 has a leading edge 604, a trailing edge 606 and side edges 608 and 610. Disc-facing surface 601 includes a cavity dam 614, side rails 616 and 618 and a center pad 620. A subambient pressure cavity 622 trails cavity dam 614 and is positioned between side rails 616 and 618. A first recessed area 624 extends along side edge 608, and a second recessed area 626 extends along side edge 610.

Side rail 616 includes convergent channel features 630 and 632. Channel feature 630 is positioned proximate recessed area 624 and channel feature 632 is positioned proximate subambient pressure cavity 622. Additionally, side rail 616 includes an outside wall 634, an inside wall 636, a center wall 638 and trailing wall 640. Outside wall 634 extends from trailing wall 640 toward cavity dam 614 and defines an opening 642 to recessed area 624. Inside wall 636 extends from trailing wall 640 toward cavity dam 614 and defines an opening 644 to subambient pressure cavity 622. Center wall 638 extends from trailing wall 640 to cavity dam 614. As a result, channel feature 630 is isolated from subambient pressure cavity 622 and open to recessed area 624. Channel feature 632 is open to subambient pressure cavity 622 and isolated from recessed area 624.

Side rail 618 is similarly structured to side rail 616 and includes channel features 650 and 652, outside wall 654, inside wall 656, center wall 658 and trailing wall 660. Outside wall 654 extends from trailing wall 660 toward cavity dam 614 and defines an opening 662 to recessed area 626. Inside wall 656 extends from trailing wall 660 toward cavity dam 614 and defines an opening 664 to subambient pressure cavity 622. Center wall 658 extends from trailing wall 660 to cavity dam 614. As a result, channel feature 650 is isolated from subambient pressure cavity 622 and open to recessed area 626. Channel feature 652 is open to subambient pressure cavity 622 and isolated from recessed area 626.

If desired, slider 600 may also include recessed corner surfaces 670 and 672. These surfaces may be recessed from bearing surface 602 by about 1 to 5 microns and aid in preventing slider 600 from contacting a surface of a disc during operation.

Figure 7:
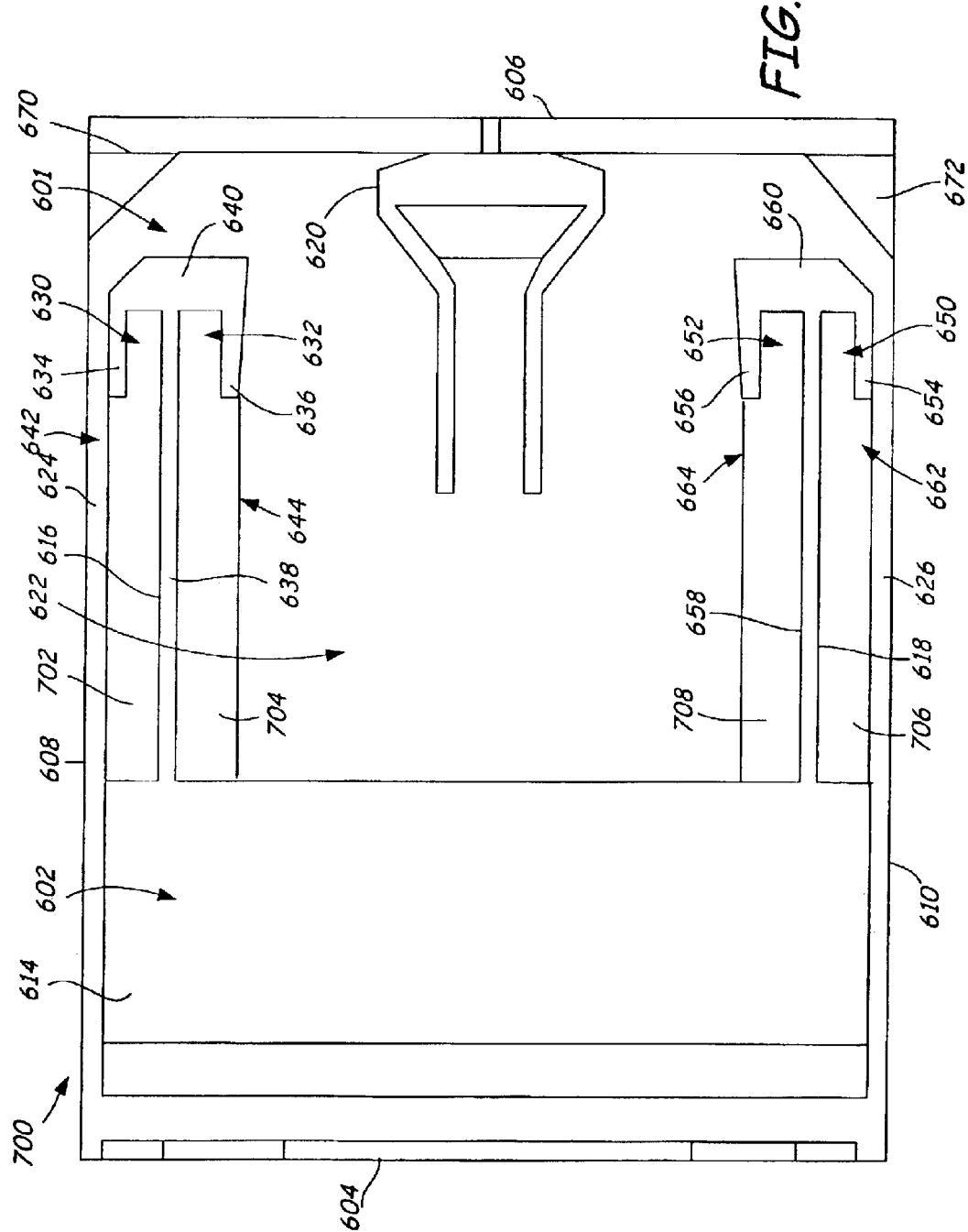

FIG. 7 illustrates slider 700 that is similar to slider 600 of FIG. 6. Common elements in slider 600 and 700 are similarly numbered. Slider 700 also includes step regions 702, 704, 706 and 708. Step region 702 is recessed from the bearing plane by a step depth and extends from channel 630 to cavity dam 614. Each of the other step regions are similarly arranged. Step region 704 extends from channel 632 to cavity dam 614, step region 706 extends from channel 650 to cavity dam 614 and step region 708 extends from channel 652 to cavity dam 614.

Figure 8:
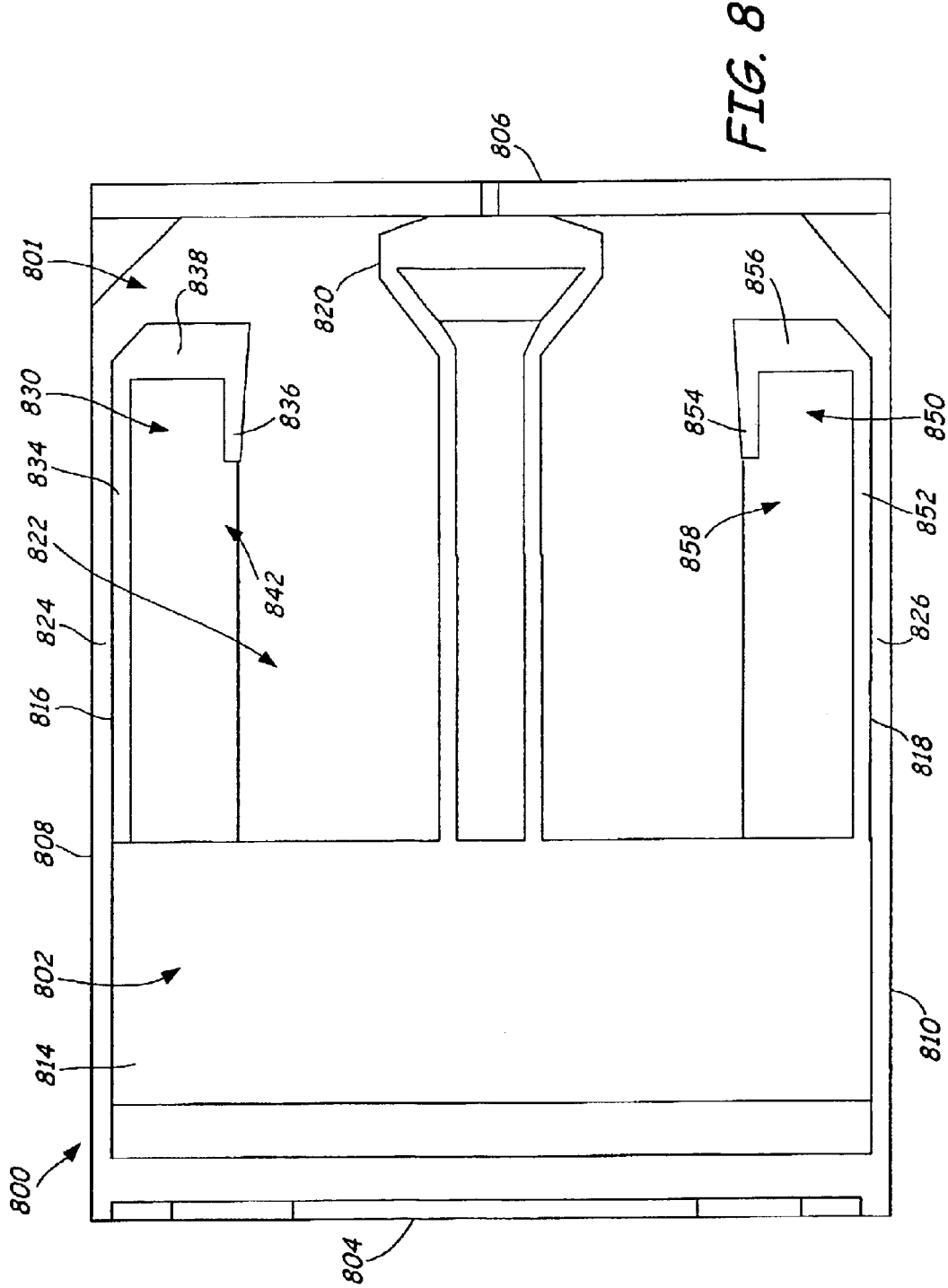

FIG. 8 illustrates slider 800 having a disc-facing surface 801 and a bearing surface 802. Slider 800 has a leading edge 804, a trailing edge 806 and side edges 808 and 810. Disc facing surface 801 includes a cavity dam 814, side rails 816 and 818 and a center pad 820. A subambient pressure cavity 822 trails cavity dam 814 and is positioned between side rails 816 and 818. Center pad 820 extends to cavity dam 814 and separates subambient pressure cavity 822 into two portions. A first recessed area 824 extends along side edge 808 and a second recessed area 826 extends along side edge 810.

Side rail 816 includes convergent channel feature 830. Additionally, side rail 816 includes an outside wall 834, an inside wall 836, and a trailing wall 838. Outside wall 834 extends from trailing wall 838 to cavity dam 814. Inside wall 836 extends from trailing wall 838 toward cavity dam 814 and defines an opening 842 to subambient pressure cavity 822. As a result, channel feature 830 is open to subambient pressure cavity 822 and isolated from recessed area 824.

Side rail 818 is similarly structured to side rail 816 and includes channel feature 850, outside wall 852, inside wall 854, and trailing wall 856. Outside wall 852 extends from trailing wall 856 to cavity dam 814. Inside wall 856 extends from trailing wall 856 toward cavity dam 814 and defines an opening 858 to subambient pressure cavity 822. As a result, channel feature 850 is open to subambient pressure cavity 822 and isolated from recessed area 826.

Figure 9:
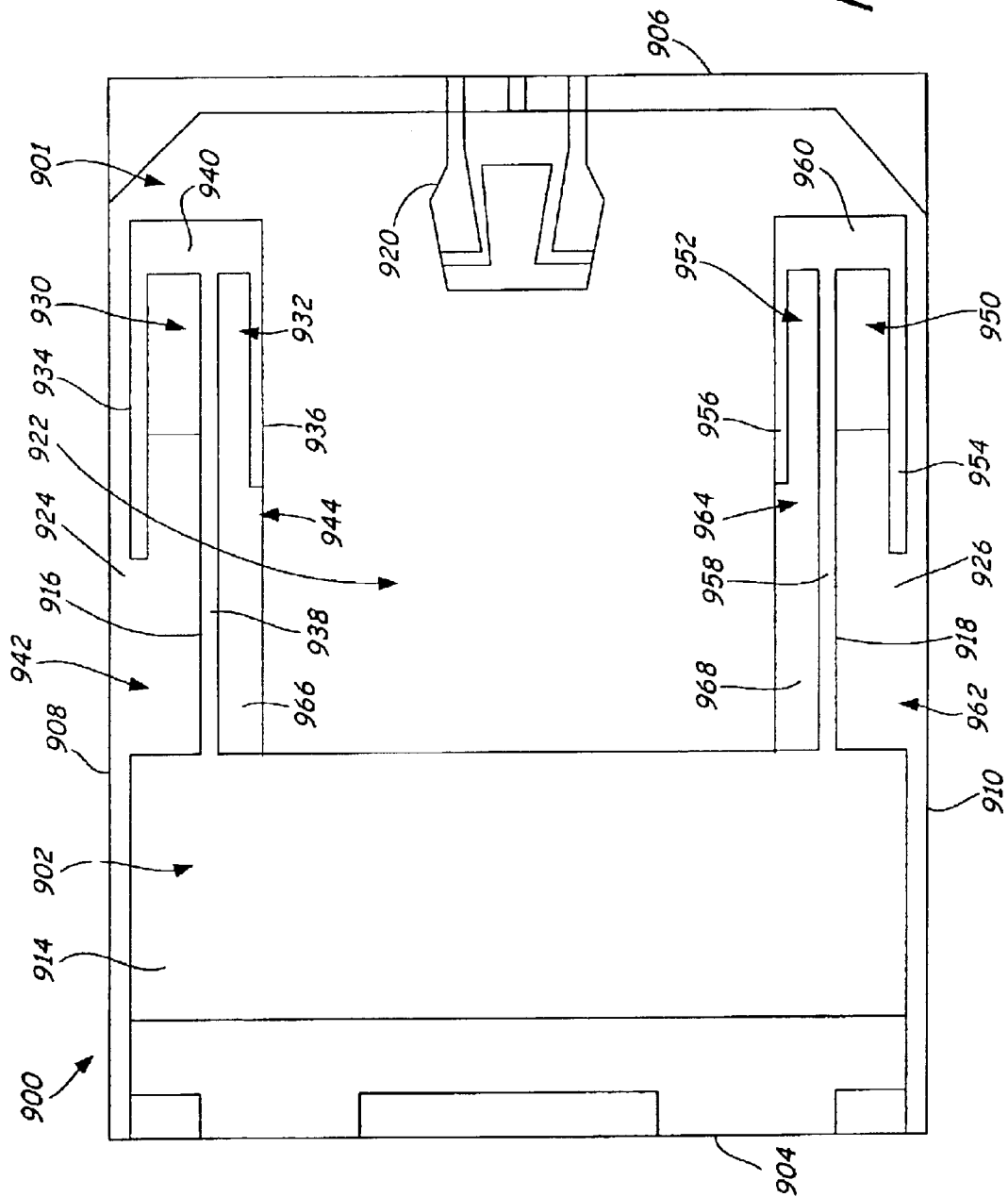

FIG. 9 illustrates slider 900 having a disc-facing surface 901 and a bearing surface 902. Slider 900 has a leading edge 904, trailing edge 906 and side edges 908 and 910. Disc facing surface 901 includes a cavity dam 914, side rails 916 and 918 and a center pad 920. A subambient pressure cavity 922 trails cavity dam 914 and is positioned between side rails 916 and 918. A first recessed area 924 extends along side edge 908 and a second recessed area 926 extends along side edge 910.

Side rail 916 includes convergent channel features 930 and 932. Channel feature 930 is positioned proximate recessed area 924, and channel feature 932 is positioned proximate subambient pressure cavity 922. Additionally, side rail 916 includes an outside wall 934, an inside wall 936, a center wall 938 and trailing wall 940. Outside wall 934 extends from trailing wall 940 toward cavity dam 914 and defines an opening 942 to recessed area 924. Inside wall 936 extends from trailing wall 940 toward cavity dam 914 and defines an opening 944 to subambient pressure cavity 922. Center wall 938 extends from trailing wall 940 to cavity dam 914. As a result, channel feature 930 is isolated from subambient pressure cavity 922 and open to recessed area 924. Channel feature 932 is open to subambient pressure cavity 922 and isolated from recessed area 924.

Side rail 918 is similarly structured to side rail 916 and includes channel features 950 and 952, outside wall 954, inside wall 956, center wall 958 and trailing wall 960. Outside wall 954 extends from trailing wall 960 toward cavity dam 914 and defines an opening 962 to recessed area 926. Inside wall 956 extends from trailing wall 960 toward cavity dam 914 and defines an opening 964 to subambient pressure cavity 922. Center wall 958 extends from trailing wall 960 to cavity dam 914. As a result, channel feature 950 is isolated from subambient pressure cavity 922 and open to recessed area 926. Channel feature 952 is open to subambient pressure cavity 922 and isolated from recessed area 926.

Step regions 966 and 968 are coplanar with and positioned in front of channels 932 and 952, respectively, in the direction of fluid flow. Step regions 966 and 968 extend from convergent channels 932 and 952 to cavity dam 914. Conversely, recessed areas 924 and 926 extend at a cavity depth to the leading end of convergent channels 950 and 952.

Figure 10:
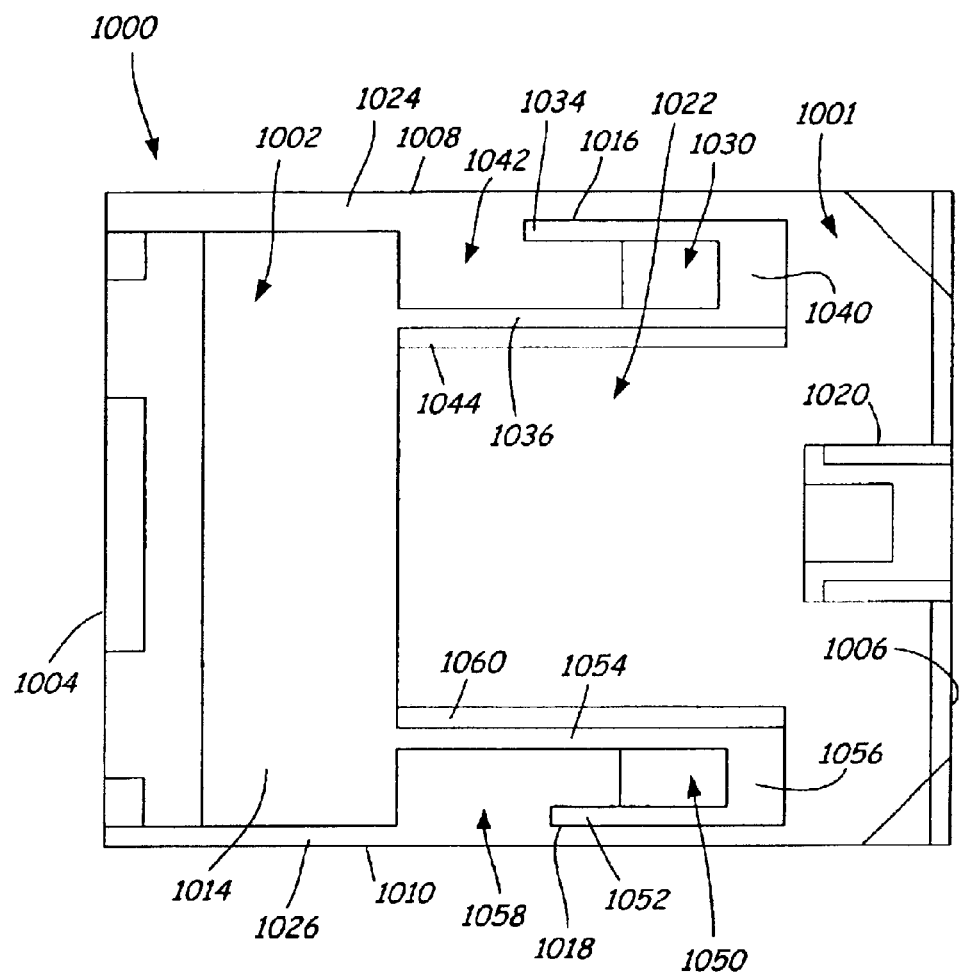

FIG. 10 illustrates slider 1000 having a disc-facing surface 1001 and a bearing surface 1002. Slider 1000 has a leading edge 1004, a trailing edge 1006 and side edges 1008 and 1010. Disc-facing surface 1001 includes a cavity dam 1014, side rails 1016 and 1018 and a center pad 1020. A subambient pressure cavity 1022 trails cavity dam 1014 and is positioned between side rails 1016 and 1018. A first recessed area 1024 extends along side edge 1008 and a second recessed area 1026 extends along side edge 1010.

Side rail 1016 includes a convergent channel feature 1030. Side rail 1016 also includes an outside wall 1034, an inside wall 1036 and a trailing wall 1040. Outside wall 1034 extends from trailing wall 1040 toward cavity dam 1014 and defines an opening 1042 to recessed area 1024. Inside wall 1036 extends from trailing wall 1040 to cavity dam 1014. As a result, channel feature 1030 is isolated from subambient pressure cavity 1022 and open to recessed area 1024. Side rail 1016 also includes a step portion 1044 positioned adjacent 1036 and subambient pressure cavity 1022. In one embodiment, step region 1044 is recessed from inside wall 1036 by depth of 0.1 to 0.5 microns.

Side rail 1018 is similarly structured to side rail 1016 and includes a channel feature 1050, an outside wall 1052, an inside wall 1054 and a trailing wall 1056. Outside wall 1052 extends from trailing wall 1056 toward cavity dam 1014 and defines an opening 1058 to recessed area 1026. Inside wall 1054 extends from trailing wall 1056 to cavity dam 1014. Thus, channel feature 1050 is isolated from subambient pressure cavity 1022 and open to recessed area 1026. Furthermore, a step region extending along inside wall 1054 is provided adjacent to inside wall 1054 and subambient pressure cavity 1022. In one embodiment, step region 1060 is recessed from inside wall 1054 by depth of about 0.1 to 0.5 microns.

Figure 11:
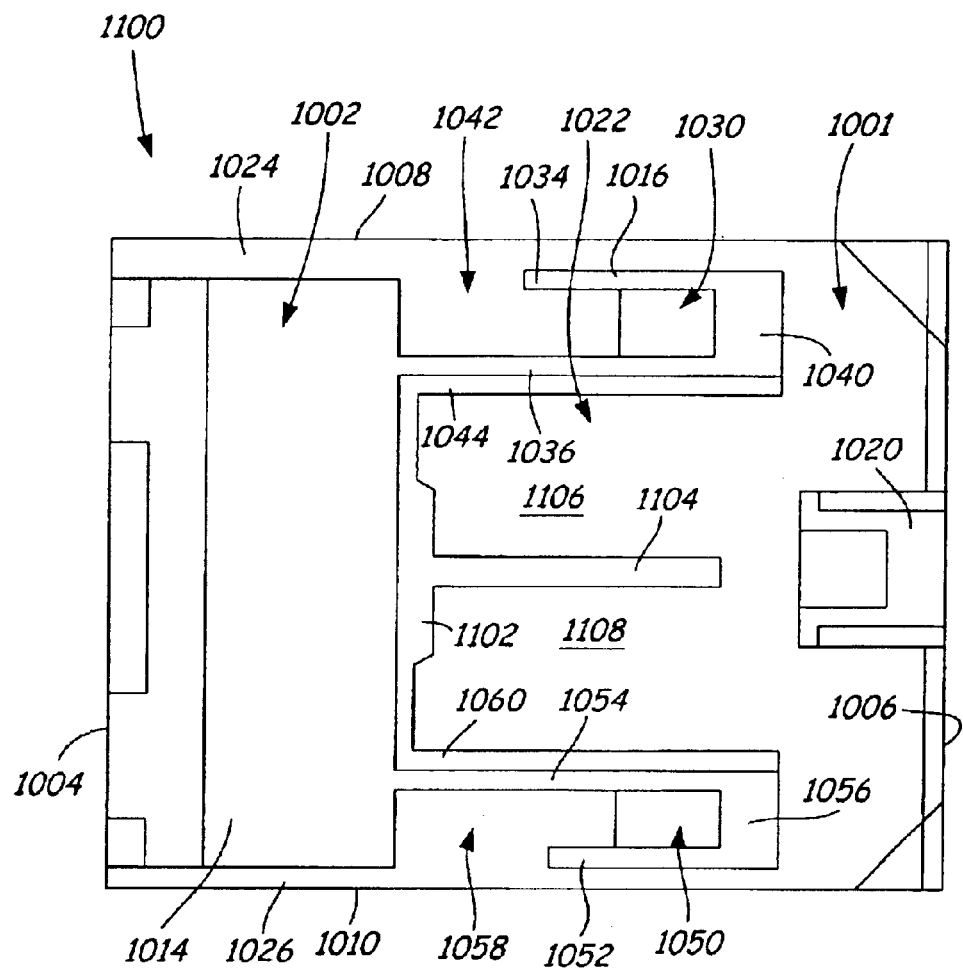

FIG. 11 illustrates slider 1100 that is similar to slider 1000 of FIG. 10. Common elements in slider 1000 and 1100 are similarly numbered. Slider 1100 also includes a step region 1102 positioned along and adjacent to cavity dam 1014 and proximate to subambient pressure cavity 1022. Additionally, a center rail 1104 trails cavity dam 1014 and extends towards trailing edge 1006. Center rail 1104 separates subambient pressure cavity 1022 into cavity regions 1106 and 1108.

Figure 12:
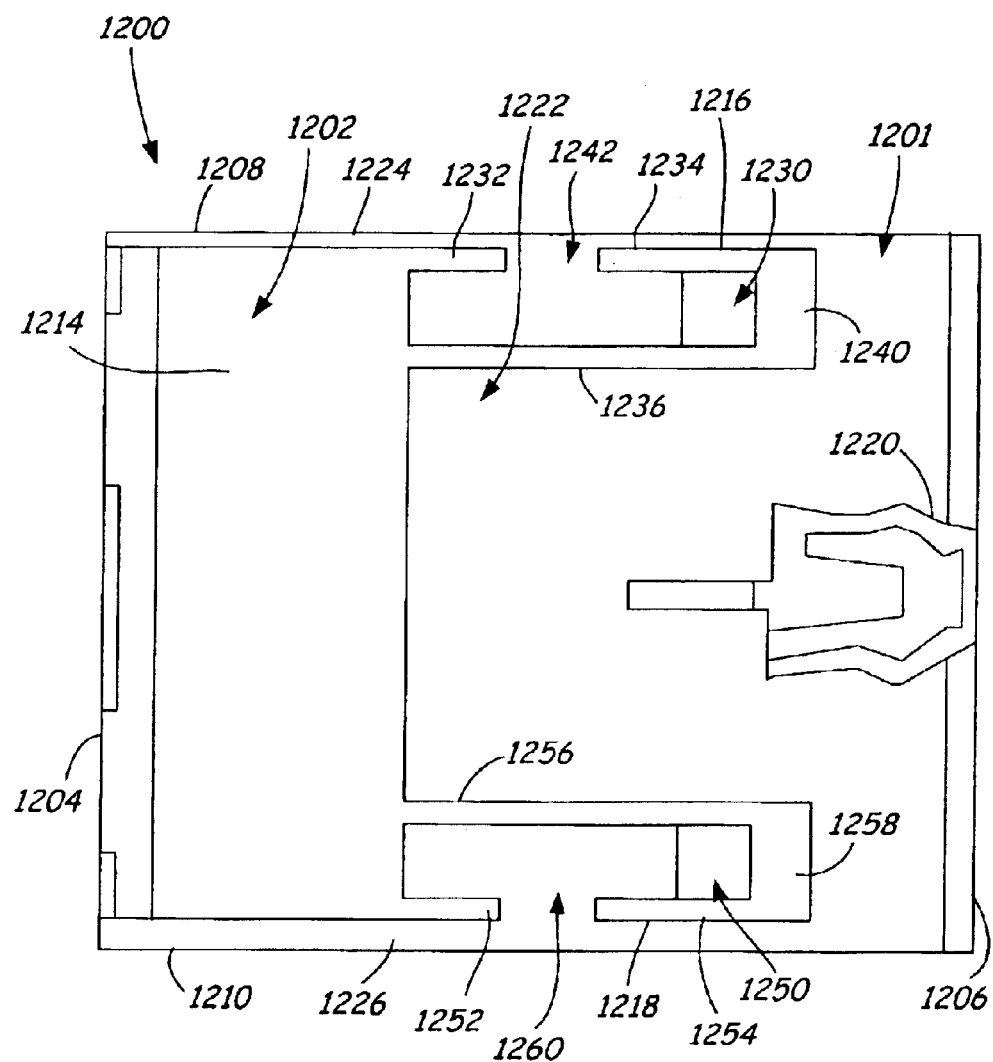

FIG. 12 illustrates slider 1200 having a disc facing surface 1201 and a bearing surface 1202. Slider 1200 has a leading edge 1204, a trailing edge 1206 and side edges 1208 and 1210. Disc facing surface 1201 includes a cavity dam 1214, side rails 1216 and 1218 and a center pad 1220. A subambient pressure cavity 1222 trails cavity dam 1214 and is positioned between side rails 1216 and 1218. A first recessed area 1224 extends along side edge 1208 and a second recessed area 1226 extends along side edge 1210.

Side rail 1216 includes a convergent channel feature 1230. Side rail 1216 also includes a leading outside wall 1232, a trailing outside wall 1234, an inside wall 1236 and a trailing wall 1240. Leading outside wall 1232 extends from cavity dam 1214 towards trailing wall 1240. Trailing outside wall 1234 extends from trailing wall 1240 toward cavity dam 1214. Together, leading outside wall 1232 and trailing outside wall 1234 define an opening 1242 to recessed area 1224. Inside wall 1236 extends from trailing wall 1234 to cavity dam 1214. Accordingly, channel feature 1230 is isolated from subambient pressure cavity 1222 and open to recessed area 1224.

Side rail 1218 is similarly structured to side rail 1216 and includes a channel feature 1250, a leading outside wall 1252, a trailing outside wall 1254, an inside wall 1256 and a trailing wall 1258. Leading outside wall 1252 and trailing outside 1254 define an opening 1260 to recessed area 1226. Inside wall 1256 extends from trailing wall 1258 to cavity dam 1214. Thus, channel feature 1250 is isolated from subambient pressure cavity 1222 and opened to recessed area 1226.

Figure 13:
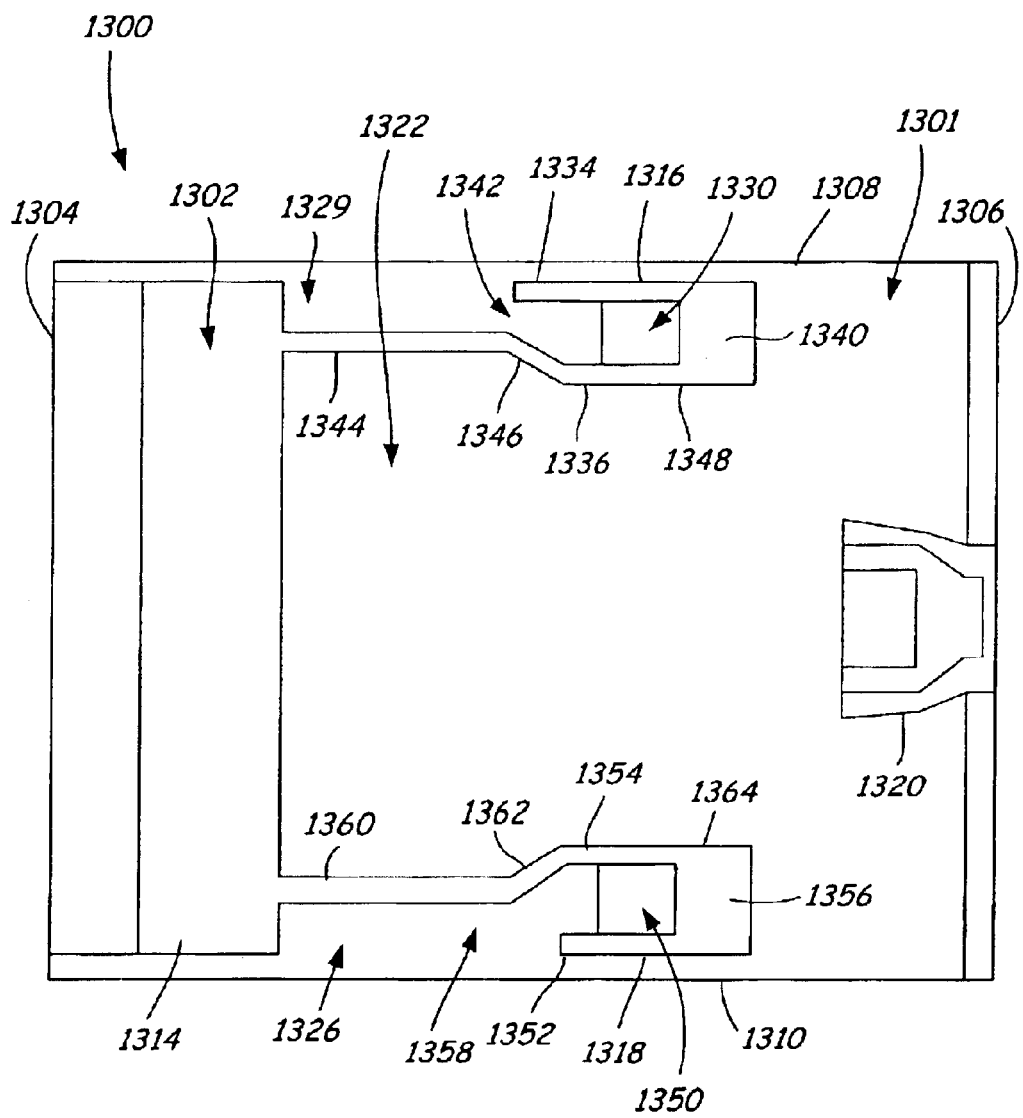

FIG. 13 illustrates slider 1300 having a disc facing surface 1301 and a bearing surface 1302. Slider 1300 has a leading edge 1304, trailing edge 1306 and side edges 1308 and 1310. Disc facing surface 1301 includes cavity dam 1314, side rails 1316 and 1318 and a center pad 1320. A subambient pressure cavity 1322 trails cavity dam 1314 and is positioned between side rails 1316 and 1318. A first recessed area 1324 extends along side edge 1308 and a second recessed area 1326 extends along side edge 1308 and a second recessed area 1326 extends along side edge 1310.

Side rail 1316 includes a convergent channel feature 1330. Side rail 1316 also includes an outside wall 1334, an inside wall 1336 and a trailing wall 1340. Outside wall 1334 extends from trailing wall 1340 toward cavity dam 1314 and defines an opening 1342 to recessed area 1324. Inside wall 1336 extends from a trailing wall 1340 to cavity dam 1314. Inside wall 1336 also includes a leading wall portion 1344, an angled waist portion 1346 and a trailing wall portion 1348. Angled waist portion 1346 is angled with respect to side edge 1308. Inside wall 1336 isolates channel feature 1330 from subambient pressure cavity 1322. Channel feature 1330 is opened to recessed area 1324.

Side rail 1318 is similarly structured to side rail 1316 and includes a channel feature 1350, an outside wall 1352, an inside wall 1354 and a trailing wall 1356. Outside wall 1352 extends from trailing wall 1356 towards cavity dam 1314 and defines an opening 1358 to recessed area 1326. Inside wall 1354 extends from trailing wall 1356 to cavity dam 1314. Furthermore, inside wall 1354 includes a leading wall portion 1360, an angled waist portion 1362 and a trailing wall portion 1364. Angled waist portion 1362 is angled with respect to side edge 1310. Channel feature 1350 is isolated from subambient pressure cavity 1322 by inside wall 1352 and is opened to recessed area 1326.

Figure 14:
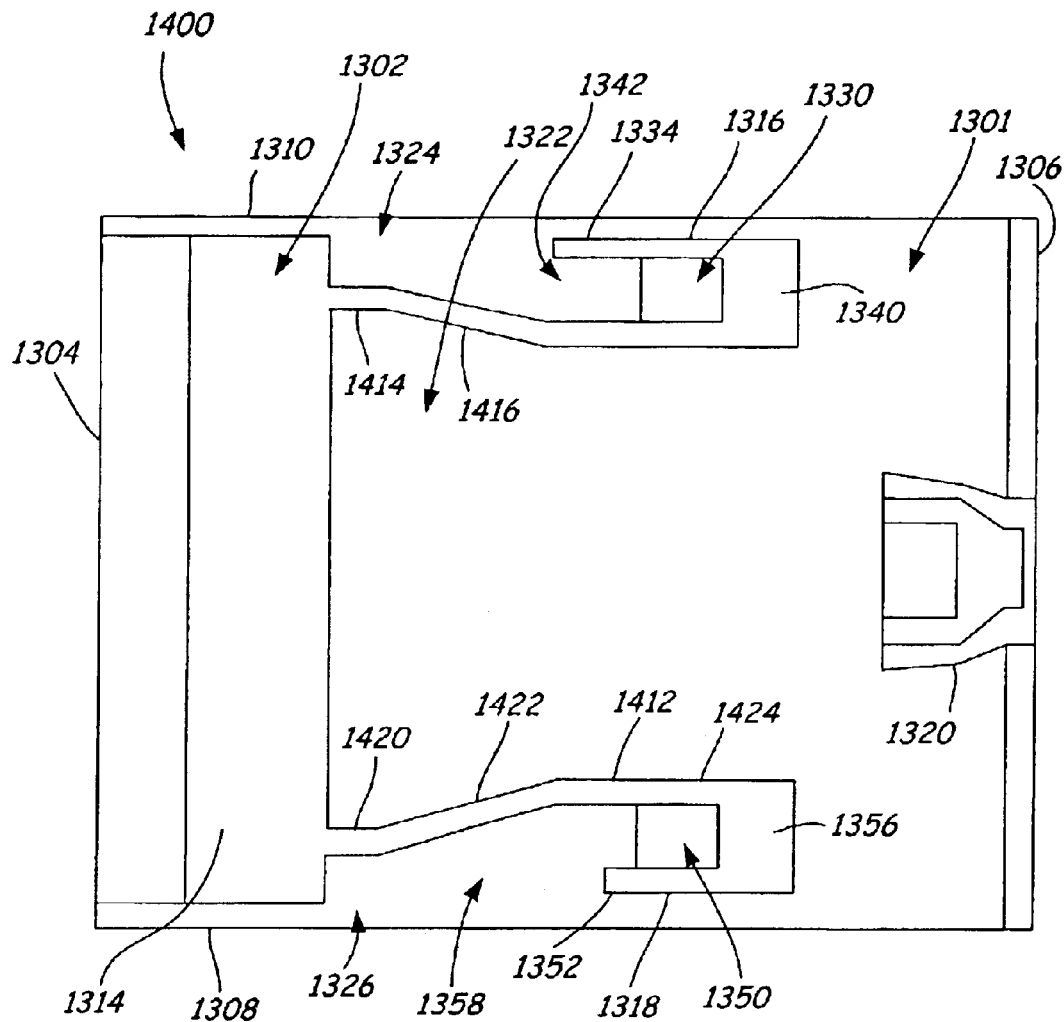

FIG. 14 illustrates slider 1400 that is similar to slider 1300 of FIG. 13. Common elements in slider 1300 and 1400 are similarly numbered. Slider 1400 includes inside walls 1410 and 1412 that serve to isolate channel features 1330 and 1350, respectively, from subambient pressure cavity 1322. Inside wall 1410 includes a leading wall portion 1414, an angled waist portion 1416 and a trailing wall portion 1418. Angled waist portion 1416 is angled with respect to side edge 1308, but is of a longer length than angled waist portion 1346 of FIG. 13. Likewise, inside wall 1412 includes a leading wall portion 1420, an angled waist portion 1422 and a trailing wall portion 1424. Similarly, angled waist portion 1422 is longer than angled waist portion 1362 of FIG. 13.

In summary, a head slider (110, 600, 800, 900, 1000, 1100, 1200, 1300, 1400) is provided having a slider body with a disc facing surface (200, 601, 801, 901, 1001, 1201, 1301) and a bearing plane. A first recessed area (240, 290, 292, 622, 624, 626, 824, 826, 922, 924, 926, 1022, 1222, 1322) and a second recessed (240, 290, 292, 622, 624, 626, 822, 922, 924, 926, 1024, 1026, 1224, 1226, 1324, 1326) area are positioned on the disc facing surface (200, 601, 801, 901, 1001, 1201, 1301) and recessed from the bearing plane. A rail (230, 232, 616, 618, 816, 818, 916, 918, 1016, 1018, 1216, 1218, 1316, 1318) on the disc facing surface (200, 601, 801, 901, 1001, 1201, 1301) has a channel (274, 276, 630, 632, 650, 652, 830, 850, 930, 932, 950, 952, 1030, 1050, 1230, 1250, 1330, 1350) that includes a first side edge proximate the first recessed area (240, 290, 292, 622, 624, 626, 824, 826, 922, 924, 926, 1022, 1222, 1322) and a second side edge proximate the second recessed area (240, 290, 292, 622, 624, 626, 822, 922, 924, 926, 1024, 1026, 1224, 1226, 1324, 1326). The channel (274, 276, 630, 632, 650, 652, 830, 850, 930, 932, 950, 952, 1024, 1026, 1230, 1250, 1330, 1350) is isolated from the first recessed area (240, 290, 292, 622, 624, 626, 824, 826, 922, 924, 926, 1022, 1222, 1322) and open to the second recessed area (240, 290, 292, 622, 624, 626, 822, 922, 924, 926, 1024, 1026, 1224, 1226, 1324, 1326).

Another embodiment of the present invention is directed to a head slider (110, 600, 800, 900, 1000, 1100, 1200, 1300, 1400) having a slider body. The slider body includes a leading edge (204, 604, 804, 904, 1004, 1204, 1304), a trailing edge (206, 606, 806, 906, 1006, 1206, 1306), a first side edge (208, 608, 808, 908, 1008, 1208, 1308), a side second edge (210, 610, 810, 910, 1010, 1210, 1310) and a disc-facing surface (200, 601, 801, 901, 1001, 1201, 1301) with a bearing plane. A cavity dam (214, 614, 814, 914, 1014, 1214, 1314) is positioned on the disc facing surface (200, 601, 801, 901, 1001, 1201, 1301). Also, a rail (230, 232, 616, 618, 816, 818, 916, 918, 1016, 1018, 1216, 1218, 1316, 1318) is positioned on the disc facing surface (200, 601, 801, 901, 1001, 1201, 1301) having a channel (274, 276, 630, 632, 650, 652, 830, 850, 930, 932, 950, 952, 1030, 1050, 1230, 1250, 1330, 1350). The channel (274, 276, 630, 632, 650, 652, 830, 850, 930, 932, 950, 952, 1030, 1050, 1230, 1250, 1330, 1350) is defined by a channel floor (286), a trailing wall (235, 238, 640, 660, 838, 856, 940, 960, 1040, 1056, 1240, 1258, 1340, 1356), a first side wall (234, 236, 638, 658, 834, 852, 938, 958, 1036, 1054, 1236, 1256, 1336, 1354) and a second side wall (233, 237, 634, 636, 654, 656, 836, 854, 934, 936, 954, 956, 1034, 1052, 1234, 1254, 1334, 1352). The first side wall (234, 236, 638, 658, 834, 852, 938, 958, 1036, 1054, 1236, 1256, 1336, 1354) extends from the trailing wall (235, 238, 640, 660, 838, 856, 940, 960, 1040, 1056, 1240, 1258, 1340, 1358) to the cavity dam (214, 614, 814, 914, 1014, 1214, 1314). The second side wall (233, 237, 634, 636, 654, 656, 836, 854, 934, 936, 954, 956, 1034, 1052, 1234, 1254, 1334, 1352) extends from the trailing wall (235, 238, 640, 660, 838, 856, 940, 960, 1040, 1056, 1240, 1258, 1340, 1356) toward the cavity dam (214, 614, 814, 914, 1014, 1214, 1314) and defines an opening between the trailing wall (235, 238, 640, 660, 838, 856, 940, 960, 1040, 1056, 1240, 1258, 1340, 1356) and the cavity dam (214, 614, 814, 914, 1014, 1214, 1314).

Yet another embodiment includes a storage assembly (100) having a housing (102), a disc (107) rotatable about a central axis (109) within the housing (102), an actuator (116) mounted within the housing (102), and a slider (110, 600, 800, 900, 1000, 1100, 1200, 1300, 1400) supported over the disc (107) by the actuator (116). The slider (110, 600, 800, 900, 1000, 1100, 1200, 1300, 1400) has a slider body with a disc facing surface (200, 601, 801, 901, 1001, 1201, 1301) and a bearing plane. A first recessed area (240, 290, 292, 622, 624, 626, 824, 826, 922, 924, 926, 1022, 1222, 1322) and a second recessed (240, 290, 292, 622, 624, 626, 822, 922, 924, 926, 1024, 1026, 1224, 1226, 1324, 1326) area are positioned on the disc facing surface (200, 601, 801, 901, 1001, 1201, 1301) and recessed from the bearing plane. A rail (230, 232, 616, 618, 816, 818, 916, 918, 1016, 1018, 1216, 1218, 1316, 1318) on the disc facing surface (200, 601, 801, 901, 1001, 1201, 1301) has a channel (274, 276, 630, 632, 650, 652, 830, 850, 930, 932, 950, 952, 1030, 1050, 1230, 1250, 1330, 1350) that includes a first side edge proximate the first recessed area (240, 290, 292, 622, 624, 626, 824, 826, 922, 924, 926, 1022, 1222, 1322) and a second side edge proximate the second recessed area (240, 290, 292, 622, 624, 626, 822, 922, 924, 926, 1024, 1026, 1224, 1226, 1324, 1326). The channel (274, 276, 630, 632, 650, 652, 830, 850, 930, 932, 950, 952, 1030, 1050, 1230, 1250, 1330, 1350) is isolated from the first recessed area (240, 290, 292, 622, 624, 626, 824, 826, 922, 924, 926, 1022, 1222, 1322) and open to the second recessed area (240, 290, 292, 622, 624, 626, 822, 922, 924, 926, 1024, 1026, 1224, 1226, 1324, 1326).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the slider while maintaining substantially the same functionality without departing from the scope and spirit of the present invention. In addition, although the preferred embodiment described herein is directed to a slider for a hard disc drive system, it will be appreciated by those skilled in the art that the teachings of the present invention can be applied to other systems, like floppy disc drives or other storage systems, without departing from the scope and spirit of the present invention.

What is claimed is:

1. A slider comprising:
   a slider body having a surface with a bearing plane;
   a first recessed area and a second recessed area positioned on the surface and recessed from the bearing plane; and
   a rail on the surface having a channel, the channel including a first side edge proximate the first recessed area and a second side edge proximate the second recessed area, wherein the channel is isolated from the first recessed area and open to the second recessed area.

2. The slider of claim 1 and further comprising a cavity dam positioned on the surface and wherein the channel is a convergent channel with a leading end open to fluid flow from the second recessed area and a trailing end closed to the fluid flow and a bearing surface within the bearing plane and extending rearward of the trailing end of the channel, a first side wall along the first side edge extending from the trailing end of the channel to the cavity dam and a second side wall along the second side edge extending from the trailing end of the channel toward the cavity dam and spaced apart from the cavity dam.

3. The slider of claim 2 and wherein the first recessed area is a subambient pressure cavity positioned behind the cavity dam in a direction of fluid flow.

4. The slider of claim 2 wherein the first and second side walls are coplanar with the bearing plane.

5. The slider of claim 2 and further comprising a step region positioned along the first side wall and along the first recessed area.

6. The slider of claim 2 and further comprising a step region extending from the channel to the cavity dam.

7. The slider of claim 1 and further comprising a third recessed area and a second rail positioned on the surface, the second rail having a second channel including a first side edge proximate the first recessed area and a side edge proximate the third recessed area, wherein the second channel is isolated from the first recessed area and open to the third recessed area.

8. The slider of claim 7 and further comprising a center rail positioned between the first and second rails.

9. The slider of claim 1 wherein the first recessed area is positioned along a side edge of the slider body.

10. The slider of claim 1 wherein the rail includes a second channel having a first side edge proximate the first recessed area and a second side edge proximate the second recessed area, wherein the second channel is isolated from the second recessed area and open to the first recessed area.

11. The slider of claim 10 and further comprising a cavity dam positioned on the surface, and wherein the rail includes an outside wall, an inside wall, a center wall and a trailing wall, and wherein the center wall extends from the trailing wall to the cavity dam and the outside wall extends from the trailing wall toward the cavity dam and defines an opening to the second recessed area and the inside wall extends from the trailing wall toward the cavity dam and defines an opening to the first recessed area.

12. The slider of claim 11 wherein at least one step region extends from at least one of the first-mentioned channel and the second channel to the cavity dam.

13. The slider of claim 11 and further comprising first and second step regions extending from the first and second channels to the cavity dam.

14. The slider of claim 1 wherein the channel is recessed from the bearing plane in the range of about 0.1 to 0.5 microns.

15. A slider comprising:
    a slider body having a leading edge, a trailing edge, a first side edge, a side second edge and a surface with a bearing plane;
    a cavity dam positioned on the surface; and
    a rail positioned on the surface and having a channel, which is defined by a channel floor, a trailing wall, a first side wall and a second side wall, wherein the first side wall extends from the trailing wall to the cavity dam and the second side wall extends from the trailing wall toward the cavity dam and defining an opening between the trailing wall and the cavity dam.

16. The slider of claim 15 wherein the cavity dam defines a subambient pressure cavity and wherein the first side wall isolates the channel from the subambient pressure cavity.

17. The slider of claim 15 wherein the first and second side walls are coplanar with the bearing plane.

18. The slider of claim 15 wherein the channel is recessed from the bearing plane by about 0.1 to 0.5 microns.

19. The slider of claim 15 and further comprising a second rail positioned on the slider body, the second rail having a channel, which is defined by a channel floor, a trailing wall, a first side wall and a second side wall, wherein the first side wall extends from the trailing wall to the cavity dam and the second side wall extends from the trailing wall toward the cavity dam and defining an opening between the trailing wall and the cavity dam.

20. The slider of claim 19 and further comprising a center rail extending from the cavity dam toward the trailing edge and positioned between the first and second rails.

21. The slider of claim 15 wherein the rail further includes a second channel, which is defined by a second channel floor, the trailing wall, the first side wall and a third side wall extending from the trailing wall toward the cavity dam and defining an opening between the trailing wall and the cavity dam.

22. The slider of claim 15 wherein the rail further comprises a leading outside wall extending from the cavity dam toward the trailing wall and further defining the opening.

23. The slider of claim 15 wherein the first side wall includes an angled waist portion that is angled with respect to at least one of the first side edge and the second side edge.

24. A data storage assembly comprising:
a housing;
a storage medium within the housing;
an actuator mounted within the housing; and
a slider supported over the storage medium by the actuator and comprising:
  a slider body having a surface with a bearing plane;
  a first recessed area and a second recessed area positioned on the surface and recessed from the bearing plane; and
  a rail on the surface having a channel, the channel including a first side edge proximate the first recessed area and a second side edge proximate the second recessed area, wherein the channel is isolated from the first recessed area and open to the second recessed area.

25. The assembly of claim 24 and further comprising a cavity dam positioned on the surface and wherein the channel is a convergent channel with a leading end open to fluid flow from the second recessed area and a trailing end closed to the fluid flow and a bearing surface within the bearing plane and extending rearward of the trailing end of the channel, a first side wall along the first side edge extending from the trailing end of the channel to the cavity dam and a second side wall along the second side edge extending from the trailing end of the channel toward the cavity dam and spaced apart from the cavity dam.

26. The assembly of claim 25 and wherein the first recessed area is a subambient pressure cavity positioned behind the cavity dam in a direction of fluid flow.

27. The assembly of claim 25 wherein the first and second side walls are coplanar with the bearing plane.

28. The head slider of claim 25 and further comprising a step region positioned along the first side wall and along the first recessed area.

29. The assembly of claim 25 and further comprising a step region extending from the channel to the cavity dam.

30. The assembly of claim 24 wherein the slider further comprises a third recessed area and a second rail positioned on the disc facing surface, the second rail having a second channel including a first side edge proximate the first recessed area and a second side edge proximate the third recessed area, wherein the second channel is isolated from the first area and open to the third recessed area.

31. The head slider of claim 30 and further comprising a center rail positioned between the first and second rails.

32. The assembly of claim 24 wherein the first recessed area is positioned along a side edge of the slider body.

33. The assembly of claim 24 wherein the rail includes a second channel having a first side edge proximate the first recessed area and a second side edge proximate the second recessed area, wherein the second channel is isolated from the second recessed area and open to the first recessed area.

34. The assembly of claim 33 and wherein the slider further comprises a cavity dam positioned on the surface, and wherein the rail includes an outside wall, an inside wall, a center wall and a trailing wall, and wherein the center wall extends from the trailing wall to the cavity dam and the outside wall extends from the trailing wall toward the cavity dam and defines an opening to the second recessed area and the inside wall extends from the trailing wall toward the cavity dam and defines an opening to the first recessed area.

35. The assembly of claim 34 wherein at least one step region extends from at least one of the first-mentioned channel and the second channel to the cavity dam.

36. The assembly of claim 34 wherein the slider further comprises first and second step regions extending from the first and second channels to the cavity dam.

37. The assembly of claim 24 wherein the channel is recessed from the bearing plane in the range of about 0.1 to 0.5 microns.

* * * * *